United States Patent [19]

Nakayama et al.

[11] 4,206,488

[45] Jun. 3, 1980

[54] MINIATURE CASSETTE TAPE RECORDER

[75] Inventors: Hajimu Nakayama, Moriguchi; Toru Iwaki, Osaka, both of Japan

[73] Assignee: Sanyo Electric Co., Ltd., Osaka, Japan

[21] Appl. No.: 911,982

[22] Filed: Jun. 2, 1978

[30] Foreign Application Priority Data

Jun. 2, 1977 [JP] Japan .................................. 52-65524

[51] Int. Cl.² .................... G11B 23/06; G11B 15/10
[52] U.S. Cl. ...................................... 260/96.1; 360/62
[58] Field of Search ..................... 360/96, 60, 62, 71, 360/137, 96.1–96.5

[56] References Cited

U.S. PATENT DOCUMENTS

| | | | |
|---|---|---|---|
| 3,591,186 | 6/1971 | Murata | 360/96 |
| 3,921,214 | 11/1975 | Nyffenegger | 360/60 |
| 3,932,892 | 1/1976 | Saito | 360/96 |
| 4,021,854 | 5/1977 | Saito | 360/60 |

*Primary Examiner*—Alfred H. Eddleman
*Attorney, Agent, or Firm*—Armstrong, Nikaido, Marmelstein & Kubovcik

[57] ABSTRACT

A magnetic tape recording and reproducing apparatus which comprises a casing of flat rectangular cubic configuration, a tape cartridge loading portion provided in a front main surface of the casing, a reproducing push-button operably provided on a first long face of the casing with respect to the front main surface, a recording push-button operably provided on a second long side face of the casing in a position confronting the reproducing push-button, with the first main surface of the casing therebetween, the reproducing push-button and recording push-button being arranged to be pushed from the first and second long side faces of the casing in directions opposite to each other for selectively bringing the magnetic tape recording and reproducing apparatus into recording and reproducing states.

7 Claims, 7 Drawing Figures

MINIATURE CASSETTE TAPE RECORDER

BACKGROUND OF THE INVENTION

The present invention relates a magnetic tape recording and reproducing apparatus and more particularly, to a miniature cassette tape recorder that may sufficiently be held in an operator's single right hand, and employs a magnetic tape in a self-contained miniature cartridge or cassette, for example, the so-called micro-cassette and arranged to be usable through very simple operations.

Commonly, it has been a general trend to miniaturize various equipment and apparatuses such as cameras, electrical and electronic appliances, and especially in the field of magnetic tape recording and reproduction apparatuses, miniaturization or ultra-miniaturization of the apparatus bodies has been under way, following development of small sized cassettes such as the miniature cassettes.

It is to be noted, however, that reduction of size of the magnetic tape recording and reproduction apparatus to the above described extent is not fully achieved through mere miniaturization of each component part, and that all of such component parts can not always be readily miniaturized from the view point of performance, thus it being required to develop novel constructions in order to cope with such miniaturization, while it is necessary to provide the magnetic tape recording and reproduction apparatus of such small size with functions such as recording, reproduction, fast forwarding, rewinding, etc., generally required for the apparatus of the kind and also with space for mounting the cartridge or cassette in a casing of the apparatus, with various control push-buttons being so arranged as to facilitate operations.

Although various arrangements concerning the miniaturization of the tape recorder have conventionally been proposed, the resultant miniaturized cassette tape recorders are still bulky in size and especially difficult to be handled by a user's single hand.

A miniature cassette tape recorder disclosed, for example, in U.S. Pat. No. 4,021,854 patented on May 3, 1977 is characterized in its manner of operation, wherein recording and reproducing circuit means is switched into a reproducing condition when both recording and reproducing button and recording button are moved in the first direction from their first positions to their second positions, and into a recording condition when only the recording button is moved in the second direction from its first position to its third position and then both the recording and reproducing button and the recording button are moved in the first direction with the recording and reproducing button being moved from its first position to its second position and the recording button being moved from its third position to its fourth position. Furthermore, both the recording and reproducing button and recording button are provided at the same right side surface of the tape recorder body, with the both extending normal to the lengthwise direction of the recorder body.

As is clear from the abovementioned description, since the tape recorder of the prior art includes two-direction and four-position operation just only for a recording operation, the operation for the recording is naturally quite complicated to be effected in the user's single hand. Furthermore, together with the operational complexity mentioned above, the parallel dispositions of both buttons in a short side width of the body tends to cause an erroneous operation, when the user wishes to promptly set said tape recorder to the recording condition.

In addition, according to the tape recorder of the prior art, since the rewind and review operating button can not be pushed during the recording operation, the undesirable signal sound recorded previously in the course of the recording operation can not be erased, if not accompanied by a series of the complex actuations of the tape recorder as mentioned above. Furthermore, the miniature cassette tape recorder of the above described type is not commonly provided with mechanical arrangement, which makes it possible to change the reproducing state into the recording state without releasing the reproducing state. Therefore, the undesirable portion of the recorded contents can not be magnetically erased in a simple operational manner.

SUMMARY OF THE INVENTION

Accordingly, an essential object of the present invention is to provide a miniature cassette tape recorder which can be handled by a user's single hand, and which can perform various kinds of operations in an extremely efficient manner.

Another important object of the present invention is to provide a miniature cassette tape recorder of the above described type, which can be actuated through mere pushing without requiring any other forms of operation for the actuation.

A further object of the present invention is to provide a miniature cassette tape recorder of the above described type, which can perform a review operation without any intermediate operations during either a recording operation or a reproducing operation and yet change the reproducing state into the recording state in a simple manner.

A still further object of the present invention is to provide a miniature cassette tape recorder of the above described type, which is simple in structure and highly efficient in use and can be manufactured at low cost.

In accomplishing these and other objects according to one preferred embodiment of the present invention, there is provided a miniature cassette tape recorder, which comprises a slim, rectangular cubic outer casing for the recorder body having side walls; a chassis means for mounting the recorder body on both surface thereof, including mounting means; a cassette receiving portion for setting therein a cassette in a predetermined position; a tape driving means for driving the tape in the tape feeding and rewinding directions including a motor, a flywheel driven by the motor, a capstan coupled with the flywheel, a pinch roller cooperating with the capstan, tape feeding means and rewinding means having a tape supply reel driving shaft, a tape take-up reel driving shaft and feeding tape by means of the tape take-up reel driving shaft and rewinding tape by means of the tape supply reel driving shaft, and brake means; a magnetic recording and reproducing head and an erasing head; a recording button and a recording and reproducing button and a stopping button and a rewinding and reviewing button, each being disposed at either one of the walls of the outer casing; recording and reproducing circuit means having an electrical source change-over switch; means connecting the four buttons and the circuit means inlcuding a recording sliding member of spring returning type secured to the recording button, a recording and reproducing sliding member of spring returning type secured to the recording and reproducing button, a stopping sliding member of spring returning type secured to the stopping button, a rewinding and reviewing sliding member of spring returning type secured to the rewinding and reviewing button, a basic board of spring returning type having a curved circumference to be effected for a cam mechanical movement thereon and provided with the magnetic recording and reproducing head at the bottom end thereof, a basic board of spring returning type provided with the magnetic erasing head, a lock lever of spring returning type for locking the recording and reproducing sliding member when actuated by the recording and reproducing button, a control lever for locking the recording sliding member when actuated by the recording and reproducing button with the recording button being kept to be effected and simultaneously driving the basic sliding board towards the tape and the capstan through the cam mechanism when actuated by the recording and reproducing button, said control lever actuated by the recording button being in turn driven by the rewinding and reviewing button to a released condition, a recording control lever having a curved circumference to be effected for a cam mechanical movement for driving the basic board toward the tape when actuated by the recording button, an operation lever of spring returning type for unlocking the recording and reproducing sliding member when actuated by the stopping button, a sliding lever of spring returning type for releasing the brake system and driving the tape take-up reel driving shaft when actuated by either the stopping button or the recording and reproducing button through the recording and reproducing sliding member, a rewinding lever of spring returning type for driving the tape supply reel driving shaft through the rotation of the flywheel when actuated by the rewinding and reviewing button, a pivot lever for interrupting the rotation of the tape take-up reel driving shaft when actuated by the rewinding and reviewing button, a switch slide of spring returning type connected with the sliding lever for actuating the electric source changeover switch.

Furthermore, for a user's convenience to handle the tape recorder by his single right hand, the miniature cassette tape recorder of the present invention has push-buttons as mentioned above arranged in a manner such that the recording and reproducing push-button and the rewinding and reviewing push-button are both disposed at the same right side wall of the outer casing, with the both extending parallel to the lengthwise direction of the outer casing, the stopping push-button being disposed at the front end wall of the outer casing, while the recording push-button is disposed at the left side wall of the outer casing, and positioned at nearly the same vertical level from the bottom of the outer casing as the position of the recording and reproducing push-button.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
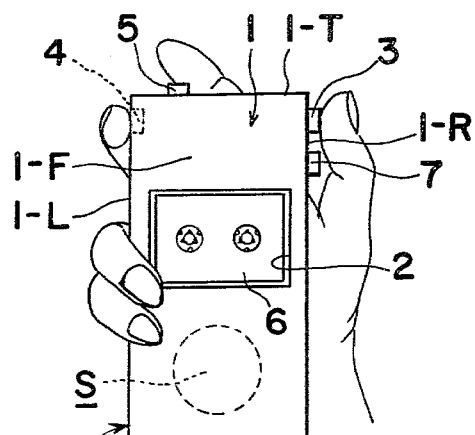
FIG. 1 schematically shows a miniature cassette tape recorder in accordance with one preferred embodiment of the present invention, held by a user's right hand for operation.

Referring now to the drawings, there is shown in FIG. 1, a miniature megnetic tape recording and reproducing apparatus or miniature cassette tape recorder M according to one preferred embodiment of the present invention held in an operator's right hand, in a stationary state or a stopped state. The miniature cassette tape recorder M generally comprises an outer casing 1 of rectangular cubic configuration with a narrow width, a housing or a cassette receiving portion 2 provided with a lid of the clicked type, which not only comprises a part of the front surface (1-F) of a recorder body but also has a transparent observing portion thereon, for setting therein a miniature cassette 6, a reproducing push-button 3 projected from a right hand side wall (1-R) seen from the front of the outer casing 1, a recording push-button 4 accommodated inside the left hand side wall (1-F) seen from the front of the outer casing 1 and positioned at nearly the same vertical level from the bottom of the outer casing 1 as the vertical location of the reproducing push-button 3 mentioned above, a stopping push-button 5 positioned on the front end wall (1-T), a rewinding push-button 7 projected from the right hand side wall (1-R) and positioned below the reproducing push-button 3 mentioned above, and a speaker S accommodated inside said casing 1.

The miniature cassette tape recorder is further provided at its front end wall (1-T) with an earphone jack, a microphone jack, a volume control knob, a sound absorbing portion for a microphone incorporated into the tape recording body, and a recording operation indicating window, while on the rear side thereof, a housing with a slidable lid, which also covers a part of the rear surface of the recorder body, for setting therein batteries is provided, although not particularly shown in the drawings.

Furthermore, a cassette tape speed converter is provided on the front surface (1-F), while a fast feed operating button is provided on the right hand side wall (1-R), although not particularly shown in the drawings.

Interior of the housing 2 is arranged to set the miniature cassette to be accommodated in position so that the miniature cassette accommodated therein can be maintained in a stable state during operation. A cassette holder (not shown) may be applicable for holding the miniature cassette in position. Furthermore, a pair of reel driving shafts, a capstan which is rotated at a constant speed by a driving force transmitted from a motor, a pinch roller, a magnetic recording and reproducing head, and a magnetic erasing head are each disposed in position in and around the housing 2, although these are not particularly shown in FIG. 1 and will be specifically described hereinbelow.

Furthermore, in the locations of these push-buttons, especially the recording and reproducing push-button 3, recording push-button 4, and stopping push-button 5 are disposed in a manner such that pushing the reproduction push-button 3 with the thumb, and pushing the recording push-button 4 with the middle finger as well as pushing the stopping push-button 5 with the forefinger are all, simultaneously accomplished by the user's single right hand as shown in FIG. 1 when the user holds the recorder in his right hand for operation. Moreover, under the stationary state of non-operating condition as shown in FIG. 1, the recording and reproducing push-button 3 and stopping push-button 5 as well as rewinding push-button 7 are all, projected from the outer casing 1 so as to be pushed at each outer end thereof for the operations, while the whole of the recording push-button 4 is accommodated inside the outer casing 1, thereby not to be operable from the outside of the outer casing 1.

With reference to FIG. 2 to FIG. 5, the mechanism concerning each push-button will be more specifically described hereinbelow.

Figure 2:
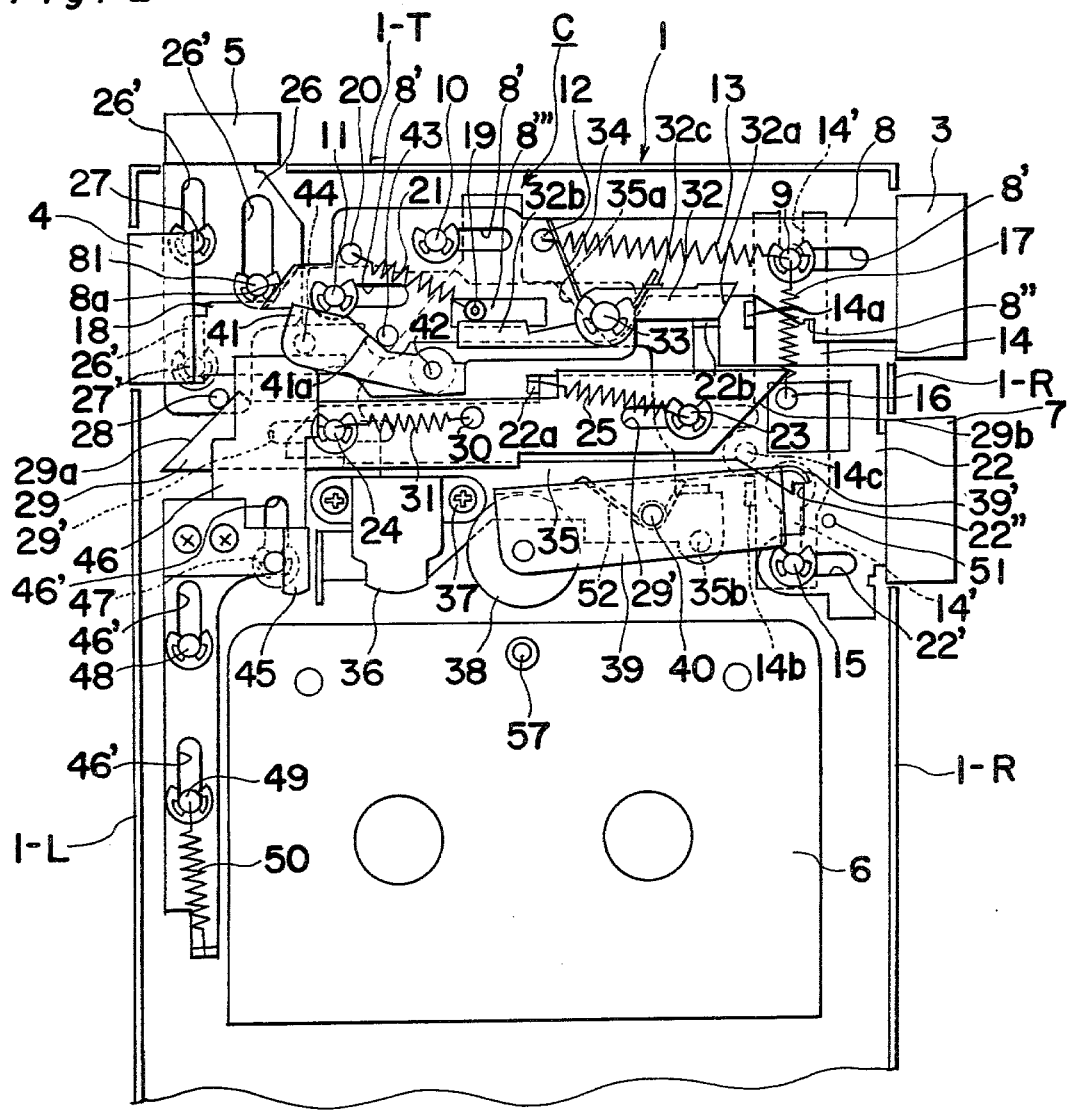
FIG. 2 is a partial top plan view of a miniature cassette tape recorder in accordance with one preferred embodiment of the present invention in a stopped state, with an upper part of an outer casing removed for ease of illustration.

As shown in FIG. 2, the recording and reproducing push-button 3 is secured to a sliding member 8 of spring returning type at one end thereof. The sliding member 8 provided with three grooves 8', 8', 8' with which engage guiding pins 9, 10, 11 secured to a chassis C respectively, is permitted to slide on the chassis in the substantially horizontal direction through the pin-groove arrangement. Furthermore, the sliding member 8 is urged toward the right in the stopped state through a first spring 13 held under a stretching state whose one end is secured to a lug 12 mounted on the sliding member 8, while the other end of the first spring 13 is secured to the guiding pin 9, which is fixed to the chassis at the bottom end thereof and extends through the groove 8' formed in the sliding member 8 since the counter movement of the sliding member 8 is stopped through a spring 34 and the lug 12 engagement, whereby the recording and reproducing push-button 3 is arranged to be projected from the side wall (1-R) of the outer casing 1, to be operable from the outside of the outer casing 1.

Moreover, the sliding member 8 has a recessed portion 8" on the circumference thereof to be engaged and thereby, held by a lug 14a provided in a lock lever 14 through lug-recess engagement, when the sliding member 8 is internally shifted up to its left end position defined by pin-groove arrangement described above against the spring force exerting thereon.

Similarly, the lock lever 14 mentioned above provided with two grooves 14', 14' with which engage the guiding pin 9 as described above and an another guiding pin 15 secured to the chassis C respectively, is permitted to slide on the chassis in the substantially vertical direction through the pin-groove arrangement. Furthermore, the lock lever 14 is urged upward in the stopped state through a second spring 17 held under a stretching state, opposite ends of which are connected with a lug 16 mounted on the lock lever 14 and the guiding pin 9 described above which also extends through the groove 14' formed in the lock lever 14, respectively, since the counter movement of the lock lever 14 itself is stopped by the grooves 14', 14' and the pins 9, 15 engagement.

The recording push-button 4 is secured to a sliding member 18 at one end thereof. The sliding member 18 itself is movable in the substantially horizontal direction by means of pin-groove arrangement between a lug 19 mounted on the sliding member 18 and an groove 8''' formed in the member 8. Furthermore, the recording push-button 4 is also provided with a third spring 21, both ends of which are connected to the lug 19 and a lug 20 mounted on the left end surface of the sliding member 8, respectively as shown in FIG. 2. However, the sliding member 18 is to be assembled in a manner such that the lug 19 mounted on the sliding member 18 and extended through the groove 8''', forces the sliding member 18 to slide towards left through the rebounding force of the third spring 21 when the sliding member 8 is slid in the left direction and thereby, the sliding member 18 is to be pushed to slide in the right direction by the button 4 till it being engaged by the notched portion of the control lever 32, wherein although the recording push-button 4 secured to the sliding member 18 is also urged toward substantially left by the third spring 21, both ends being connected with a lug 20 mounted on the left end surface of the sliding member 8 and the lug 19 described above, the spring force concerning the sliding member 8, which is arranged beforehand to be much larger than that concerning the sliding member 18 and conversely directing with respect to the spring force concerning the sliding member 18 mentioned above, inwardly draws to accommodate both the sliding member 18 and its securing button 4 inside the outer casing 1 so that the recording push-button 4 can not be operable from the left side wall (1-L) of the outer casing 1 in the stopped state.

The rewinding and reviewing push-button 7 is secured to a sliding member 22 at the one end thereof. Similarly, the sliding member 22 provided with three grooves 22', 22', 22' with which engage guiding pins 15, 23, 24 secured to the chassis C respectively, is permitted to slide on the chassis in the substantially horizontal direction through the pin-groove arrangement. Furthermore, the counter movement of the sliding member 22 being stopped by the pins 15, 23, 24 and three grooves 22', 22', 22' engagement, the sliding member 22 is urged toward substantially right in the stopped state through a fourth spring 25 held under a stretching state, both ends of which are connected with a hooked lug 22a secured to the sliding member 22 at the upper, middle circumference of the sliding member 22 and the guiding pin 23, respectively so that the rewinding push-button 7 is arranged to be projected from the outer casing 1, to be operable from the outside of the outer casing 1 as shown in FIG. 2. Moreover, the sliding member 22 is provided with a recessed portion 22" to be engageable with the lock lever 14 and thereby, maintained at the engaging position thereof when the rewinding push-button 7 is pushed or in turn, the sliding member 22 is inwardly slid against the spring force by the fourth spring 25 described above. The sliding member 22 is further provided with a lug 22b on the prolonged portion thereof, which cooperates with a control lever 32 in a manner as will be specifically described hereinbelow.

The stopping push-button 5 is secured to a sliding member 26 at one end thereof. The sliding member 26 provided with three grooves 26', 26', 26' with which engage guiding pins 27, 27', 81 secured to the chassis C except for a guiding pin of through type 81, is permitted to slide on the chassis in the substantially vertical direction through the pin-groove arrangement. Moreover, a lug 28 is provided and mounted on the sliding member 26, which is disposed in a manner such that it may face a first slanted side face 29a of an operation lever 29 and thereby, drives the operation lever 29 therethrough.

The operation lever 29 provided with two grooves 29', 29' with which engage guiding pins 23, 24 secured to the chassis C respectively, is permitted to slide on the chassis in the substantially horizontal direction through the pin-groove arrangement. Furthermore, the operation lever 29 is urged toward left in the stopped state through a fifth spring 31, both ends of which are connected with a lug 30 mounted on the operation lever 29 and the guiding pin 24, respectively, since the counter movement of the operation lever is stopped by the grooves 29', 29' and the pins 23, 24 engagement, so that the first slanted side face 29a thereof which is in position as shown in FIG. 2, may vertically hold the sliding member 26 through frictional contact with the lug 28 mounted on the sliding member 26, and thereby, the stopping push-button 5 being projected from the outer casing 1 so as to be operable from the outside of the outer casing 1. The operation lever 29 mentioned above is further provided with a second slanted side face 29b, which is disposed to face the lug 16 mounted on the lock lever 14 mentioned earlier.

As described in the foregoing, the lock lever 14 is provided not only with the lug 14a to be engageable with the recessed portion 8" provided in the sliding member 8, but also with a lug 14b to be engageable with the recessed portion 22" provided in the sliding member 22.

The control lever 32 is pivotally mounted on a shaft 33 of through type whose one end extends through the sliding member 18 as well as the sliding member 8, and is stopped by a collar (not shown) at the bottom end thereof, and is biased around the shaft 33 in the clockwise direction by a coil spring 34 mounted on the shaft 33, both ends of which are secured to the lug 12 and a lug 32c provided in the control lever 32, to normally urge an arm 32b against the lug 19.

The control lever 32 mentioned above is provided with a slanted side surface 32a in order to cooperate with the lug 22b provided at the prolonged portion of the sliding member 22 at one end thereof, while the arm 32b is provided at the other end of the control lever 32 in order to engage with the lug 19 mounted on the sliding member 18.

A magnetic reproducing head 36 is fixedly attached to the lower end portion of a basic sliding board 35 by means of screws 37, while a pinch lever 39 provided with a pinch roller 38 is pivotally mounted on a shaft 40 mounted on the basic sliding board 35. Moreover, the basic sliding board 35 is provided with a cam cornering surface 35a, which is urged against the shaft 33 to establish a cam mechanism therebetween.

Figure 3:
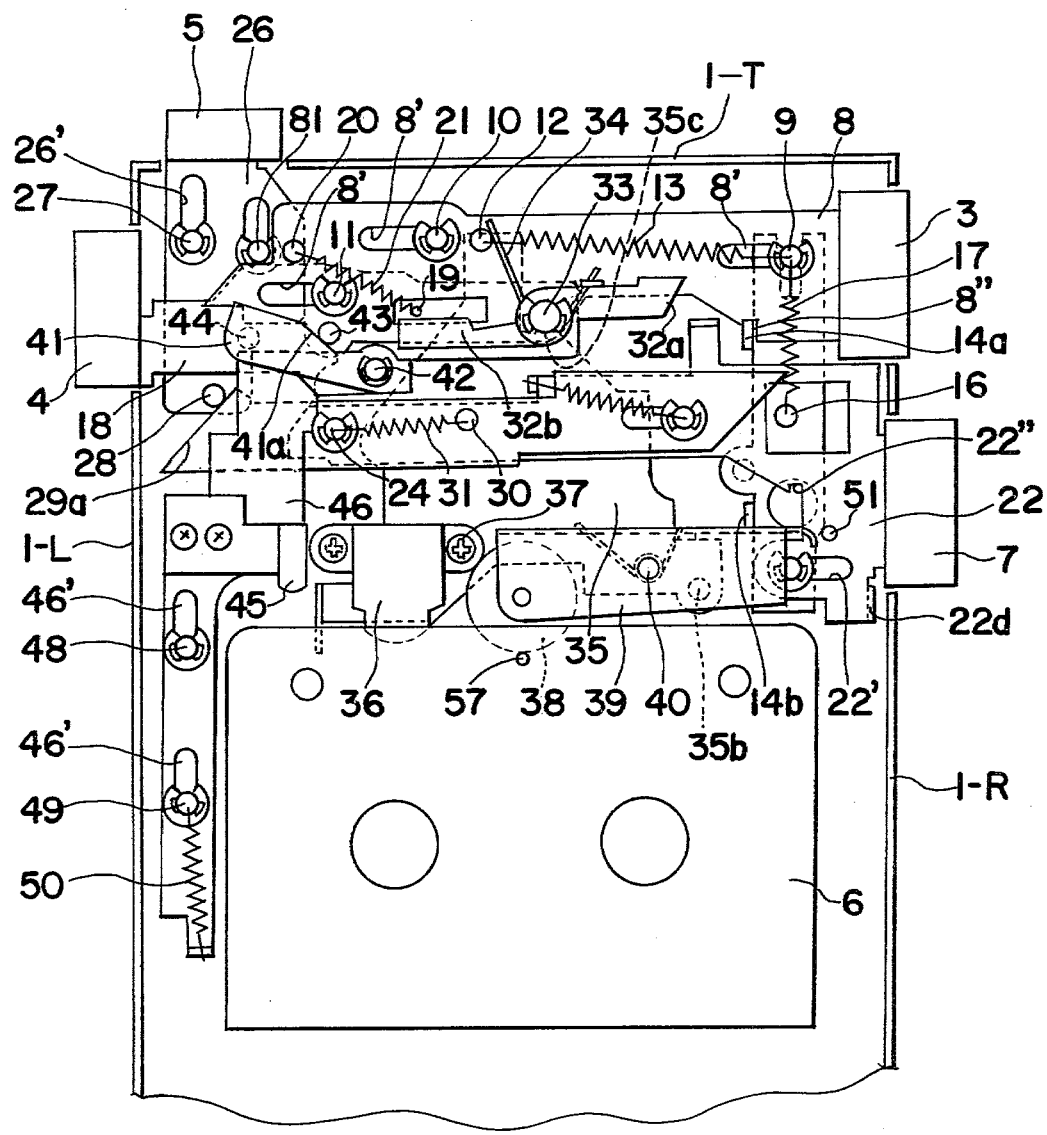
FIG. 3 is a similar view to FIG. 2, but particularly shows a state of reproduction thereof.

The basic sliding board 35 is arranged to be slidable in the substantially vertical direction through the pin and groove arrangement and is urged to a position shown in FIG. 2 through a spring force of a spring (not shown), since the counter movement of the basic sliding board 35 is stopped by the urging contact between the flat circumference 35c of the board 35 and the shaft 33. Therefore, when the sliding member 8 is slid in towards substantially left from the position shown in FIG. 2 against the spring force concerned, the basic sliding board 35 is vertically slid due to its urging contact with the shaft 33 through the cam cornering portion 35a thereof and therefore, the magnetic recording and reproducing head 36 and the pinch roller 38 secured to the basic sliding board 35 are downwards pushed into a self-contained midget cartridge or a cassette 6 to be urged against a portion of magnetic tape as well as a capstan 57, respectively in proportion to the vertical sliding displacement of the basic sliding member 35 until the basic sliding member occupies its low position as shown in FIG. 3.

A recording control lever 41 is pivotally mounted on a shaft 42 secured to the sliding member 18. A cam cornering portion 41a formed at the one side surface of the recording control lever 41 is positioned in the horizontally sliding passage of a control pin 43 mounted on the sliding member 8 so that the cam cornering portion 41a is to be driven through the friction drive caused by the sliding movement of the control pin 43 and thereby, a rear lug 44 mounted on the rear end surface of the recording control lever 41 and contacting a vertical, upper side of a basic board 46 provided with magnetic erasing head 45, causes the basic board to slide downward through friction drive as specifically shown in FIGS. 2 and 4. The basic board 46 provided with three grooves 46', 46', 46' with which engage guiding pins 47, 48, 49 secured to a chassis C respectively, is permitted to slide in the substantially vertical direction through the pin-groove arrangement independently assembled on the chassis with respect to the basic sliding board 35 provided with the magnetic recording and reproducing head 36 as well as the pinch lever 39, both of which are also capable of sliding in the substantially vertical direction described in the foregoing. Furthermore, the basic sliding board 46 is urged towards substantially upwards direction by a sixth spring 50, being stopped by the lug 44.

Figure 5:
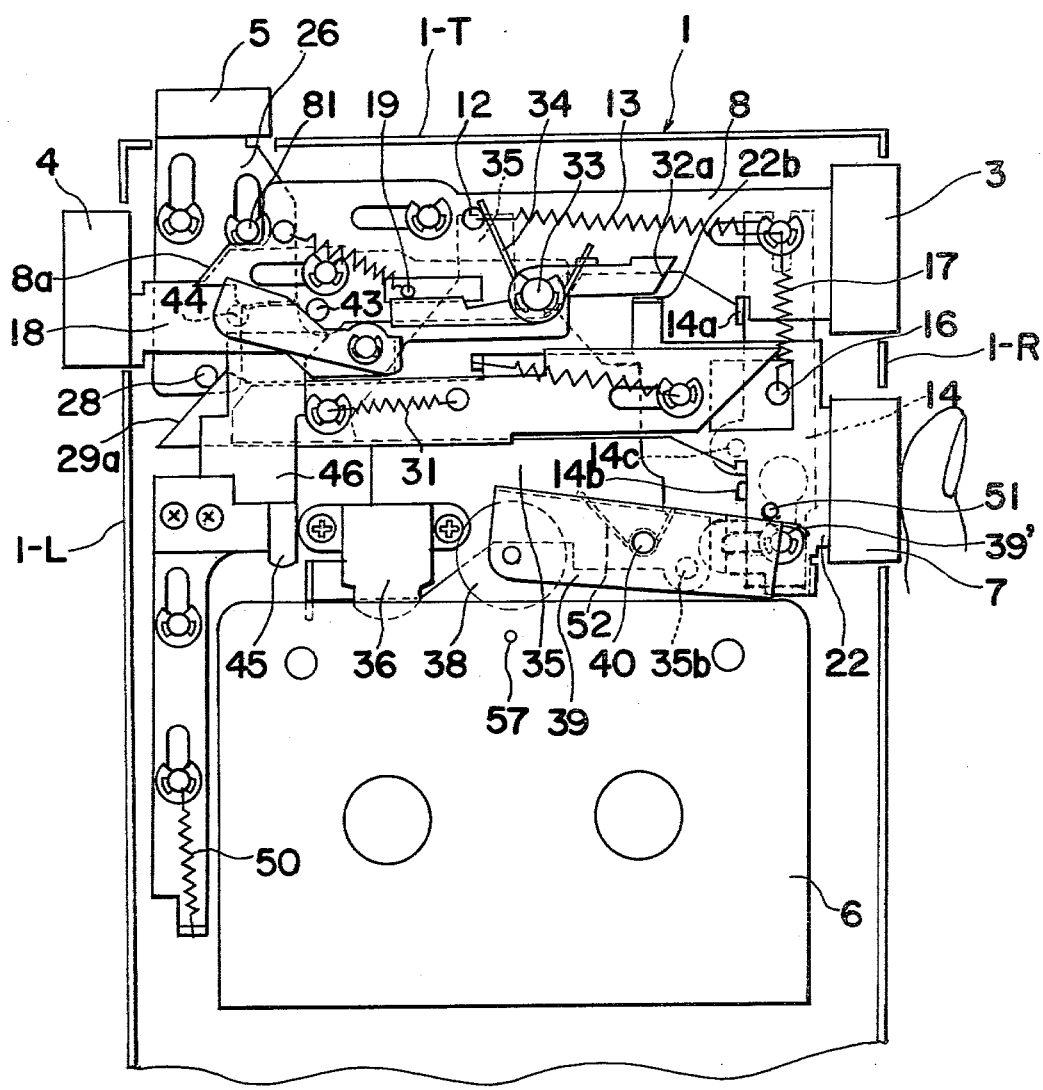
FIG. 5 is a similar view to FIG. 2, but particularly shows a state of reviewing thereof.
Figure 6:
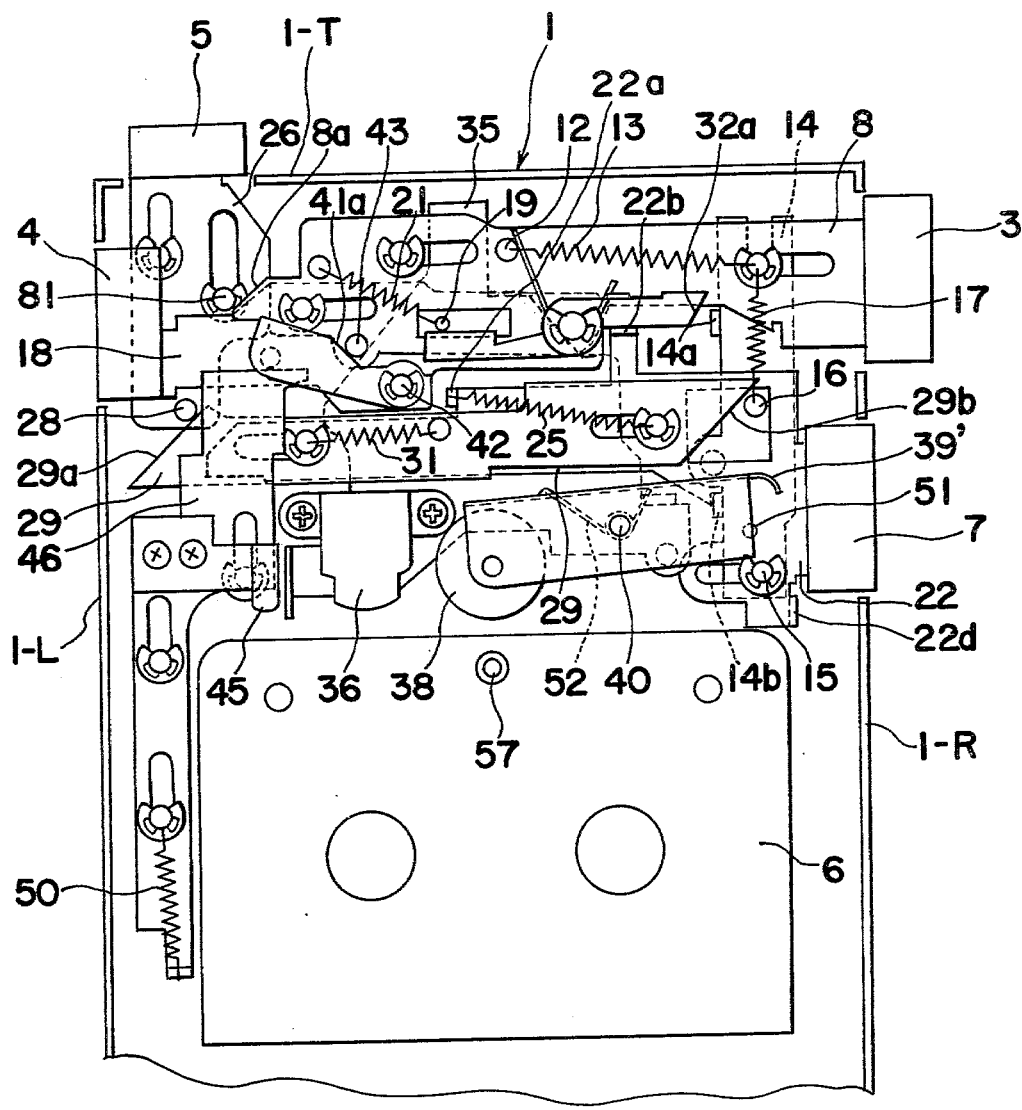
FIG. 6 is a similar view to FIG. 2, but particularly shows a state of rewinding thereof.

Moreover, as shown in FIG. 5, a lug 51 is provided on the sliding member 22. When the sliding member 22 is slidably shifted toward left and thereby, the lug 51 mounted on the member 22 comes into contact with the curved projection 39' during the state of reproduction as shown in FIG. 5, the pinch lever 39 is pivoted with respect to a shaft 40 against a biasing force caused by a spring 52 mounted on the shaft 40 through a friction drive caused by the lug 51, and exerting upon the curved projection 39' made at the front, upper left edge of the pinch lever 39.

Figure 7:
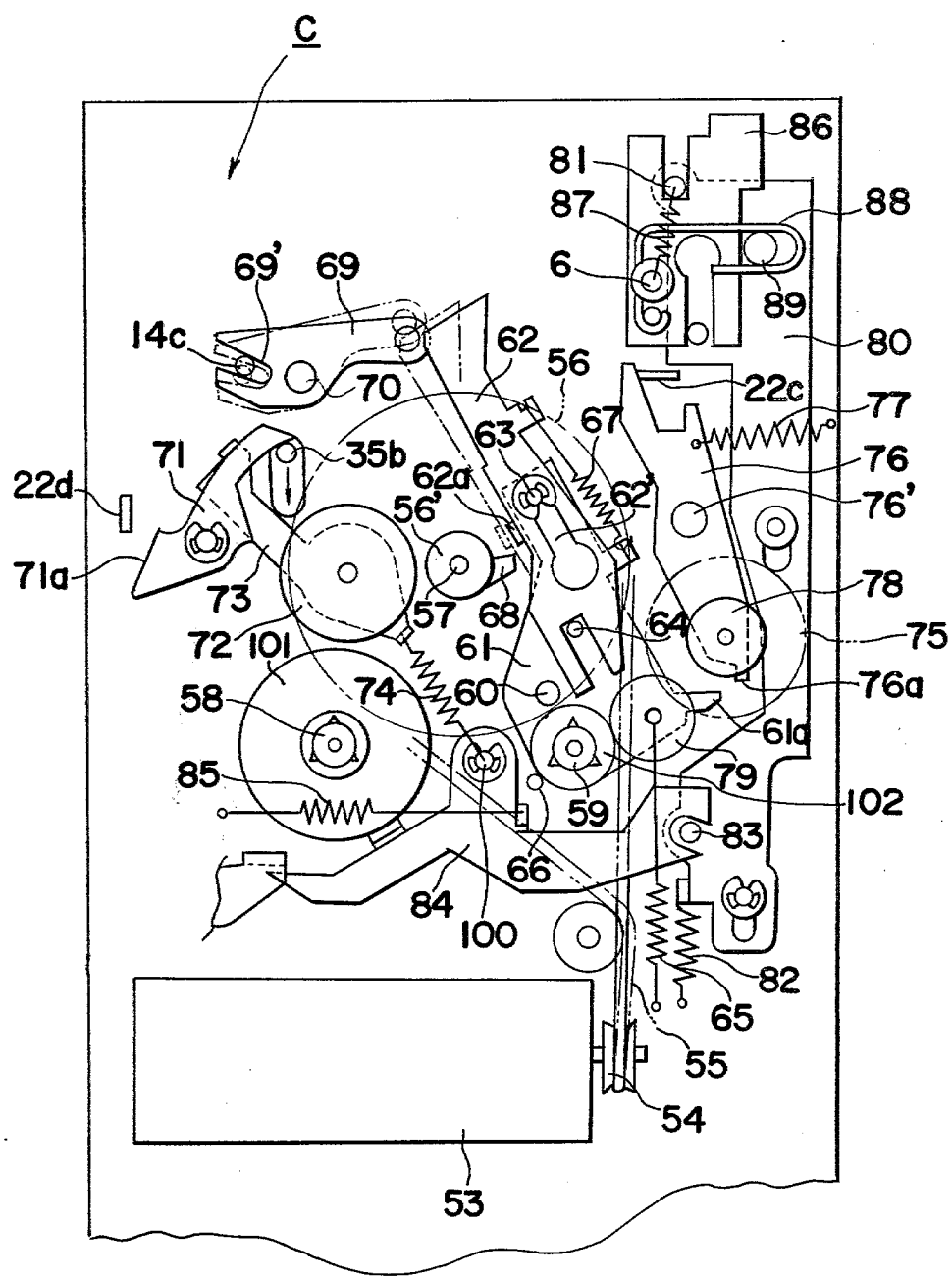
FIG. 7 is a partial rear side view of a miniature cassette tape recorder in accordance with one preferred embodiment of the present invention, with an outer casing removed for clarity.

A driving mechanism of the magnetic tape is specifically shown in FIG. 7. A belt 55 connecting a pully 54 of a motor 53 and a flywheel 56, rotates the flywheel 56 and then, the capstan 57 mounted on the same shaft in a counterclockwise direction. The driving mechanism mentioned above further includes a driving shaft of a tape supply reel 59 and a driving shaft of a tape take up reel 58. The driving shaft of the tape supply reel 59 is mounted on an oscillating lever 61, which oscillates with respect to a shaft 60. A detecting lever 62 is connected with the oscillating lever 61 through pin-groove arrangement between grooves provided therein 62', 62' and guiding pins 63, 64. Furthermore, the oscillating lever 61 is urged clockwise through a spring force due to a seventh spring 65 so that the driving shaft of the tape supply reel 59 is disposed at predetermined position, with stopped from a further clockwise motion by a stopper 66, while in connection with the situation concerning the oscillating lever 61 mentioned above, the detecting lever 62 is urged in one direction through a spring force caused by a eighth spring 67, one end of which is secured to the oscillating lever 61. Furthermore, since the detecting lever 62 is provided with a projected portion 62a at one side surface thereof, the projected portion 62a is arranged to position inside the rotational geometric area of a projection 68 copossessing the same rotational shaft with the flywheel 56, when both the driving shaft of the tape supply reel 59 and the oscillating lever 61 are pivotally deviated towards the counterclockwise direction against the spring force caused by the spring 65 by a tentional force of the magnetic tape increased at the final state of the reproduction or the recording operation as shown in FIG. 7.

Thus, in connection with the abovementioned description, after the detecting lever 62 having been transformed to the location denoted by a broken line from the location denoted by a real line in FIG. 7 due to the deviation mentioned above, since the detecting lever 62 newly positioned is to be slid by the rotational force of the flywheel 56, the detecting lever 62 causes a pivotal movement concerning a head portion of the detecting lever 62 to permit the rear pin 14c of the lock lever 14 interposed inside a crotch-portion formed in the end of a release lever 69 to shift. Therefore, the lock lever 14 is slidably moved against the spring force of the second spring 17 and thereby, a locking state of the sliding member 8 due to the engagement with the member 14a is released.

As shown in FIG. 7, a pin 35b of through type, which is mounted on the lower portion of the basic sliding board 35 and extended through the chassis, is slid to a direction denoted by an arrow shown in FIG. 7 and thereby, permits a pivot lever 71 to pivotally move in the clockwise direction, when the reproducing process is effected. Therefore, a lever 73 provided with a rewinding idler 72, copossessing the same shaft with the idler 72 at the one end portion thereof, is drawn by a spring force of the ninth spring 74, whereby the idler 72 is interposed between the wheel of the tape take up reel 101 and a boss portion 56' of the flywheel 56 mentioned in the foregoing.

A reference numeral 22c at the right side as well as the reference numeral 22b at the left side in FIG. 7 are both operational portions. These are the portions of the sliding member 22, being backward bent and extended through the chassis and thereby they slide in the right direction in FIG. 7, when the sliding member 22 is conversely slid.

The operational portion 22c, when slid following with the sliding motion of the sliding member 22, permits a lever 76 provided wth a rewinding idler 75 to pivotally move with respect to a shaft 76' in a clockwise direction through a spring force caused by a tenth spring 77, one end of which is connected with the lever 76 and yet, as a result, the rewinding idler 75 to urgedly contact the outer surface of the flywheel 56. Furthermore, in the mechanical situation mentioned above, a gear 78 mounted on the same shaft with the rewinding idler 75, after having been also pivotally slid due to the copossession of the same shaft with the rewinding idler 75 and thus, rotated through the resultant rotation of the rewinding idler 75, drives the rear gear of the tape take up reel 102 to rotate through an idling gear 79.

For a reproducing operation, the operational portion 22d, when accompanied with the sliding motion of the sliding member 22, moves to contact a slanted side face 71a of the pivot lever 71 and thus frictionally drives the pivot lever 71, whereby the rewinding idler 72 is released from the contact relation with the rear wheel of the tape take up reel 101 through the effect of the lever 73.

A sliding lever 80, is capable of sliding to the upward direction against a spring force caused by an eleventh spring 82 through a pin-groove arrangement of the guiding pin, when the front end of the guiding pin 81 of through type is frictionally driven by the slanted side face 8a positioned at the left end of the sliding member 8 as shown in FIG. 2. The sliding lever 80 mentioned above drives a brake lever 84 to cause it to pivotally move in the clockwise direction with respect to a shaft 100 against a spring force caused by a twelfth spring 85 through a pin 83 of through type mounted thereon, and thereby, a brake system related to the rewinding wheel 101 is successively released, when actuated to slide to the upward direction as described above.

The reference numeral 86 indicates a switch slide, which not only is slidably connected with the sliding lever 80 and is connected with the pin 81 of through type by means of a thirteenth spring 87, but also is secured to a spring 88 to effect a pin 89 actuating a main ON-OFF switch (not shown). The switch slide 86 mentioned above, if the reproducing process is effected, is slidably moved in the upward direction in order to be positioned at the nearer location with respect to the location of the stopping push-button 5 so that the actuator or the pin 89 of the main ON-OFF switch or the change-over switch located at an OFF position is converted to an ON position due to the effect of the spring 88 of string type secured to the switch slide 86 mentioned above.

During the reproducing state, if the stopping push-button 5 is comparatively slightly pushed in the downward direction, the switch slide 86 is to be slidably moved in the downward direction against the spring force caused by the thirteenth spring 87 and yet, changes the location of the actuator 89 of the main ON-OFF switch from the ON-position to the OFF-position to maintain a pausing state of the reproduction process. However, with the stopping push-button 5 being further pushed from the state just mentioned above, the switch slide 86 forces the sliding member 26 in FIGS. 2 and 4 to frictionally drive the operation lever 29 toward right so that the right end portion 29b may frictionally drive the lock lever 14 in the downward direction to disengage the locking condition of lug-recess engagement concerning the sliding member 8 and thereby, the reproducing process is successively stopped.

A miniature cassette tape recorder of the present invention, of which characteristic construction is detailed in the foregoing, has the operational characteristics as follows.

(1) A change-over operation from the stopping state to the reproducing state

During the stopping state as shown in FIG. 2, as soon as an operator pushes the recording and reproducing push-button 3 by his right thumb, without pushing the recording push-button 4 by his right middle finger, the sliding member 8 is slidably moved toward left against the urging force caused by the first spring 13, thus forcing the recording control lever 41 and sliding member 18 to simultaneously slide as a whole in the same direction through the spring force of the third spring 21 so that the reproducing push-button 4 secured to the sliding member 18 is to be projected from the outer side face of the outer casing 1 as shown in FIG. 3.

The situation mentioned above, in which the recording push-button 4 is projected, is maintained, as long as the resultant lug-recess engagement between the recessed portion 8" provided in the sliding member 8 and the lug 14a provided in the lock lever 14 is successively accomplished.

Furthermore, a sliding motion of the abovementioned sliding member 8 toward left frictionally drives the basic sliding board 35 in the downward direction through the effect of the combination of the shaft 33 secured to the sliding member 8 and the cam cornering portion 35a so that the magnetic recording and reproducing head 36 as well as the pinch roller 38 are to be pushed into the cassette 6 and thereby, the pinch roller 38 is urged toward the capstan 57. In connection with the abovementioned situation, as shown in FIG. 7, the sliding lever 80 is also, simultaneously slidably moved in the upward direction, to accomplish the release of the brake system at the same time and return of the rewinding idler to the position to be operated, and ON-state of the ON-OFF main switch through the switch sliding member 86. After the accomplishment of a series of mechanical actuation mentioned above, the miniature cassette tape recorder is to be in a reproducing state as shown in FIG. 3.

(2) A change-over operation from the reproducing state to the recording state

Figure 4:
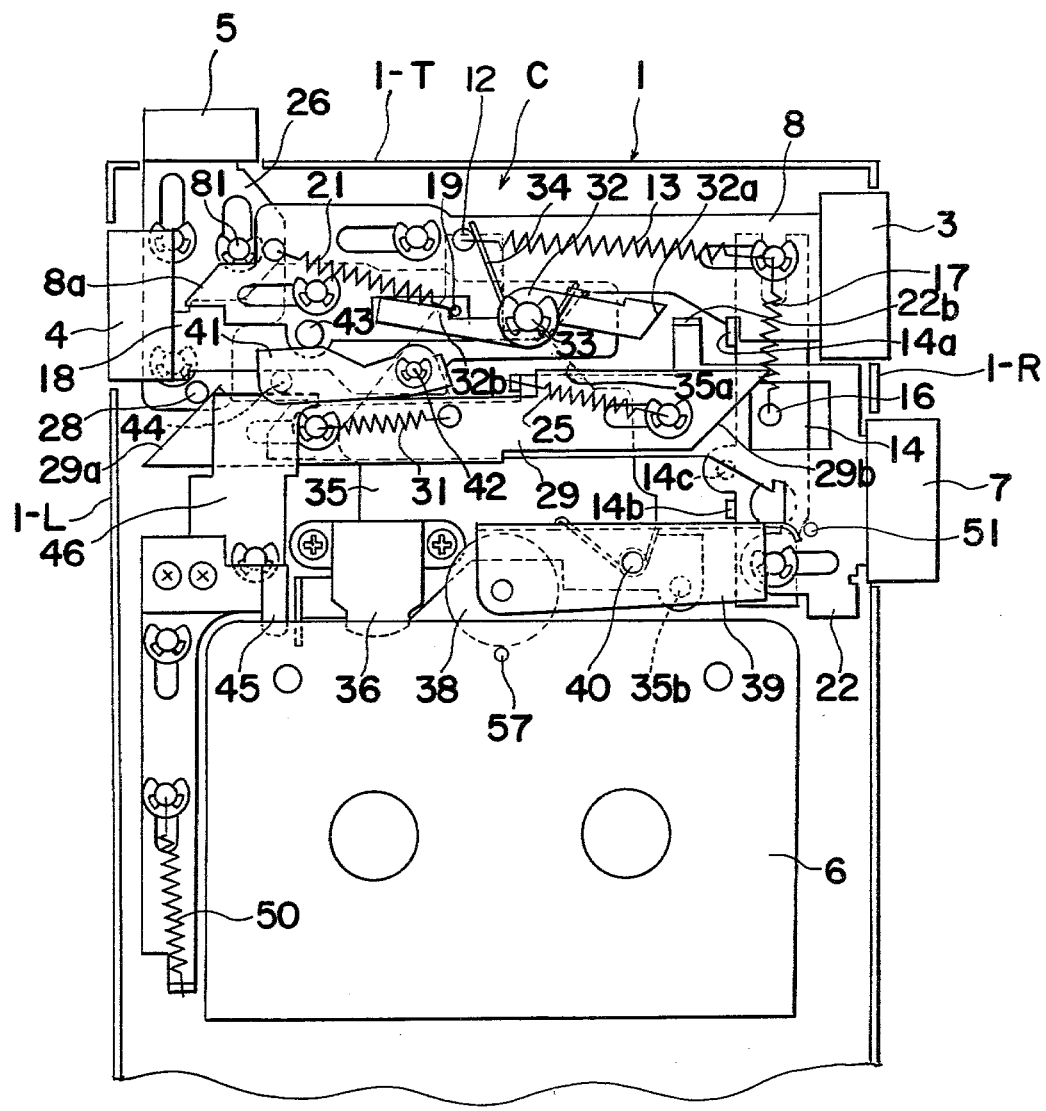
FIG. 4 is a similar view to FIG. 2, but particularly shows a state of recording thereof.

During the reproducing state mentioned in the foregoing, since the recording push-button 4 is projected from the left side face of the outer casing 1 so as to be operated, the successive pushing operation of the recording push-button 4 with the right middle finger causes the sliding member 18 to slide toward right against the spring force due to the third spring 21, till the lug 19 mounted on the sliding member 18 is to be engaged by the recessed portion of the arm 32b of the control lever 32 and thereby, maintained at the right end position thereof. Furthermore, the sliding motion of the sliding member 22 in the right direction simultaneously shifts the pivotal center 42 of the recording control lever 41 mounted on the sliding member 18 to cause the recording control lever 41 as well as the rear lug 44 to pivotally move in the counterclockwise direction until the magnetic erasing head 45 is pushed into the cassette 6 and is in contact position with the magnetic tape through the cam mechanism concerning the basic board 46 frictionally driven in the downward direction against the spring force of the sixth spring 50 during the pivotal movement of the rear lug 44. After the accomplishment of a series of mechanical actuations mentioned above, the miniature cassette tape recorder is to be in a recording state as shown in FIG. 4.

(3) A change-over operation from the stopping state to the recording state

If the recording and reproducing push-button 3 projected is pushed for the operation by the user's right thumb, with the user's middle finger, on the contrary, pushing the overhead surface of the recording push-button 4 accommodated inside the outer casing 1 to prevent it to be projected due to the mechanical characteristics mentioned in the foregoing in the stopping state, the sliding member 8 slides toward left against the spring force due to the first spring 13 until it engages the lock lever 14 frictionally driven and is maintained in position described in the foregoing, wherein the basic sliding board 35 is also slid downward.

However, since the sliding motion of the sliding member 8 in the left direction does not accompany the sliding motion of the sliding member 18 under the operational or handling condition mentioned above, the pivotal center 42 of the recording control lever 41 remains unchanged. Therefore, the recording control lever 41 is pivotally moved with respect to the shaft on the pivotal center 42 in a counterclockwise direction through the friction drive of the lug 43 mounted on the sliding member 8, which is slidably moved in accompaniment with the sliding member 8, whereby the magnetic erasing head 45 secured to the basic board 46 is pushed into the cassette 6 by the downward sliding movement of the basic board 46 pushed by the rear lug 44. After the accomplishment of a series of the mechanical actuates mentioned in the foregoing, the miniature cassette tape recorder is to be in a recording state as shown in FIG. 4.

(4) A change-over operation from the recording state to the rewinding state

During the recording process, if the rewinding push-button 7 is pushed by the user's right thumb against the urging force of the fourth spring 25, the lug 22b of the sliding member 22 engages with the slanted side face 32a of the control lever 32 and thus, frictionally drives it, thereby the control lever 32 being pivotally moved in the counterclockwise direction against the biasing force caused by the coil spring 34. Therefore, depending upon the counteraction of the pivotal movement of the control lever 32, the sliding member 18 is slid through the rebounding spring force of the third spring 21 in the left direction, and thereby, the recording push-button 4 is projected from the left surface of the outer casing 1, since the recessed portion of the arm 32b of the control lever 32 is disengaged from the pin 19 mounted on sliding member 18. As a matter of fact, accompanying with the vertical movement of the basic board 46, the magnetic erasing head 45 is successively returned to the disengaged state due to the resultant pivotal movement of the recording control lever 41 and the cam mechanism mentioned above.

Furthermore, in connection with the situation mentioned above, referring now to FIG. 7, not only the rewinding idler 75 is slid into the operational position by means of the operational portion 22c, but also the rewinding idler 72 is slid into the non-operational position by means of the operational portion 22d. Therefore, during the reproducing push-button 3 being kept in the pushed state and thereby, the reproducing push-button 3 being kept in lug-recess engagement with the lock lever 14, if the rewinding push-button 7 is pushed, the pinch lever 39 is frictionally driven and is pivotally moved by the lug 51 to cause the pinch roller 38 to disengage from the capstan 57 so that the review condition is accomplished.

(5) Upon termination of the reproduction or the recording, since the end portion of the magnetic tape is ordinarily fixedly stuck to the hub of the reel of the cassette, a stretching force or tentional force of the magnetic tape tends to be much increased as compared with the ordinary steady operational condition. Therefore, as the result, the driving shaft of the tape supply reel 59 causes the oscillating lever 61 to oscillate in a counterclockwise direction against the spring force caused by the seventh spring 65 due to the increasing tentional force of the magnetic tape and thereby, the projected portion 62a formed on the detecting lever 62, which is mounted on the oscillating lever 61 is to be positioned inside the rotational circumference of the projection 68 of the flywheel 56. Successively, the detecting lever 62 mentioned above is pivotally moved against the spring force of the eighth spring 67 to cause the pin 14c of through type of the lock lever 14 to shift by means of the release lever 69 and further, the lock lever 14 to disengage from the sliding member 8, whereby the stopping state of the miniature cassette tape recorder is accomplished.

(6) A change-over operation from the reproducing or the recording state to the stopping state During the reproducing or the recording state, if the stopping push-button 5 is pushed by the user's right forefinger, the lug 28 secured to the sliding member 26, when engaged with the first slanted face 29a of the operation lever 29, frictionally drives the operation lever 29 in the right direction against the spring force of the fifth spring, whereby the second slanted side face 29b of the operation lever 29 frictionally drives the lug 16 secured to the lock lever 14 to cause the lock lever 14 to slide in the downward direction against the spring force due to the second spring 17 and thus, subsequently, the lug 14a formed on the lock lever 14 disengages from the recessed portion 8" formed on the sliding member 8. Therefore, the reproducing sliding member 8 is now slidably moved to the right position through the rebounding force of the first spring 13, while the second slanted side face 32a of the control lever 32 is frictionally driven by the lug 22b to cause the control lever 32 to pivotally move in the counterclockwise direction and thereby, the sliding member 18 is released from the engagement with the control lever 32.

During the reproducing state, if the stopping button 5 is pushed, the sliding member 18 is slidably moved in the right direction, accompanied by the sliding motion of the sliding member 8, and therefore, the recording push-button 4 is drawn to the inside of the outer casing 1 and accommodated inside the outer casing 1. However, during the recording state, if the stopping button 5 is pushed, being actuated by the sliding movement of the sliding member 8 towards right, the recording control lever 41 as well as the basic board 46 are both returned to their original stopping positions. Therefore, after a performance of a series of the mechanical steps described in the foregoing, the miniature cassette tape recorder is brought back into the stopping state.

As is clear from the detailed description in the foregoing, the miniature cassette tape recorder of the present invention, which is formed in a slim rectangular shape so that the handling thereof can be accomplished by a user's single right hand, comprises an outer casing which can be dissembled, a housing provided with a lid of the clicked type, which comprises the part of the front surface of a recorder body, for setting a miniature cassette tape in position, a recording and reproducing push-button provided at its upper right side wall for a reproducing operation, a rewinding and reviewing push-button provided at its right side wall and positioned at the substantially lower position when compared with the position of the reproducing push-button, a recording push-button provided at its upper left side face and positioned at nearly the same vertical level from its bottom as the position of the recording and reproducing push-button, and a stopping push-button provided at its front end wall, whereby both reproducing operation and recording operation are effected only by pushing respective push-buttons located at corresponding parallel side wall. Therefore, by the arrangement described in the foregoing, when a user handles the miniature cassette tape recorder with his right hand, each of his three fingers, i.e., the thumb, the forefinger or the middle finger, is fitted to corresponding one of these three operating buttons, with the thumb being fitted to the reproducing button, the middle finger to the recording button as well as the forefinger to the stopping button, whereby the change-over operation between the reproducing state and the recording state is to be accomplished in an easy, prompt and precise manner.

Thus, the miniature cassette tape recorder of the present invention is compact in size and extremely functional, and thus highly efficient in use.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A magnetic tape recording and reproducing apparatus which comprises a casing of a flat rectangular solid configuration, a tape cartridge loading portion provided in a front main surface of said casing, a reproducing push-button operably provided on a first long side face of said casing with respect to said front main surface, said reproducing push-button being arranged to be operably pushed in an inwards perpendicular direction with respect to said first long side face of said casing, a recording push-button operable provided on a second long side face of said casing in a position opposite to said reproducing push-button, with said front main surface of said casing therebetween, said recording push-button being normally positioned in a non-operable position within said casing wherein it is not operable from the exterior of said casing and wherein upon actuation of said reproducing push-button said recording push-button projects from said casing into an operable position, said reproducing push-button and recording push-button being arranged to be pushed from said first and second long side faces of said casing inwardly in directions opposite to each other for selectively bringing said magnetic tape recording and reproducing apparatus into recording and reproducing states.

2. A magnetic tape recorder and reproducing apparatus as claimed in claim 1, and comprising further a stopping push-button operably provided on an upper short side of said casing, said stopping push-button being arranged to be depressed downward with respect to said upper short side of said casing to bring said magnetic tape recording and reproducing apparatus into a stopped state from said recording and reproducing state.

3. A magnetic tape recorder and reproducing apparatus as claimed in claim 1, and comprising further a rewinding push-button operably provided on said first long side face of said casing with respect to said front main surface, with being disposed at a substantially lower level from a bottom short side when compared with a position of said reproducing push-button, said rewinding push-button being arranged to be depressed downward with respect to said first long side face of said casing.

4. A magnetic tape recorder and reproducing apparatus as claimed in claim 3, said rewinding push-button being capable of being depressed with both said reproducing push-button and recording push-button being kept under a depressed state, whereby a review operation is effected without resetting either said reproducing button or said recording button.

5. A magnetic tape recorder and reproducing apparatus as claimed in claim 1, and comprising further a recording and reproducing magnetic head, and an erasing magnetic head, said recording and reproducing magnetic head being effected in operation by an actuation of said reproducing push-button, said erasing magnetic head being independently effected by an actuation of said recording push-button, whereby an erasing operation is effected during a reproducing operation.

6. A miniature cassette tape recorder for magnetically recording audio signal in a magnetic tape in a cassette and magnetically reproducing audio signal recorded on the tape, which can be handled by a user's single hand, comprises a slim rectangular cubic outer casing for a recorder body having side walls; a cassette receiving portion for setting therein a cassette in a predetermined position; a tape driving means for selectively driving the tape in tape feeding and rewinding directions; a magnetic recording and reproducing head and an erasing head; recording and reproducing circuit means having an electrical source change-over switch; a plurality of operation buttons including a recording and reproducing push-button and a recording button, said recording and reproducing push-button for a recording and reproducing operation projected outwardly from an upper portion of one lengthwise side wall of said outer casing, with said recording push-button being accommodated inside an upper portion of other lengthwise side wall of said outer casing and positioned at nearly the same vertical level from a bottom side wall of said outer casing as a position of said recording and reproducing push-button; chassis means for slidably mounting said buttons, said chassis means mounting said recording and reproducing button for movement in a first direction between a first and second position and said recording button for movement in a second direction substantially opposite to said first direction between a third and fourth position; means connecting said two buttons and circuit means including a first sliding member of spring returning type having sahd recording and reproducing magnetic head mounted thereon, a second sliding member of spring returning type having said erasing magnetic head mounted thereon, a recording and reproducing sliding member of spring returning type coupled to said recording and reproducing button, and a recording sliding member of spring returning type coupled to said recording button, said recording and reproducing sliding member being urged toward said second direction through a first spring concerned thereof, said recording and reproducing sliding member being movable in said first direction for driving said first sliding member in a direction substantially normal to said first direction through friction drive to cause said recording and reproducing magnetic head to make contact with a portion of a magnetic tape, said recording sliding member being urged toward said first direction through a second spring concerned thereof, said recording member being movable in said second direction for driving said second sliding member in a direction substantially normal to said second direction through friction drive to cause said erasing magnetic head to make contact with a portion of said magnetic tape, a spring force of said first spring being relatively effective when compared with a spring force of said second spring, said recording and reproducing sliding member having a groove formed therein and a notch while said recording sliding member having a pin mounted thereon which is extending through said groove of said recording and reproducing sliding member and normally disengaged from said notch only when said recording sliding member is moved in said second direction and disposed at said fourth position, one end of said second spring being secured to said pin, with another end of said second spring being connected with said recording and reproducing sliding member, whereby said recording sliding member is forced to slide toward said first direction through a rebounding force of said second spring when said recording and reproducing sliding member is slid in said first direction and thereby, being to be actuated to slide in said second direction by said recording button till said recording sliding member being engaged by said notch, when said recording and reproducing sliding member occupies said second position.

7. A miniature cassette tape recorder as claimed in claim 6, and comprising further a stopping push-button projected from a front side wall of said outer casing, a stopping sliding member coupled to said stopping push-button and being movable in said direction substantially normal to said first direction, said stopping sliding member being provided with a pin thereon, a locking sliding member of spring returning type being maintained in urged condition in an upward normal direction to said first direction and movable in a downward normal direction to said first direction, said locking sliding member provided with a projected portion at a circumference thereof for locking said recording and reproducing sliding member and further provided with pin mounted on a surface thereof, a third sliding member of spring returning type being urged in said first direction and being movable in said second direction, said third sliding member being provided with a first slanted portion and a second slanted portion at each horizontal end thereof in a manner such that said first slanted portion is frictionally driven by said pin of said stopping sliding member when said stopping push-button actuated while said pin mounted on said locking sliding member being frictionally driven by said second slanted portion of said third sliding member, said recording and reproducing sliding member further provided with a locally slanted portion as well as a recessed portion in a circumference thereof so that recording and reproducing sliding member can be locked through an engagement between said pin mounted on said locking sliding member and said recessed portion of said recording and reproducing sliding member when the recording and reproducing sliding member occupied said second position.

* * * * *